United States Patent
O'Dell et al.

(10) Patent No.: US 10,417,840 B2
(45) Date of Patent: *Sep. 17, 2019

(54) METHODS, SYSTEMS AND APPARATUS FOR AUTOMATED GENERATION OF A FLIGHT LOG AND A SQUAWK LIST FILE

(71) Applicant: Gulfstream Aerospace Corporation, Savannah, GA (US)

(72) Inventors: Robert O'Dell, Savannah, GA (US); Jim Gallagher, Savannah, GA (US); Keith Conzachi, Savannah, GA (US); Noelle Britt, Midway, GA (US); Kevin Claffy, Savannah, GA (US); William Kerekesh, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,561

(22) Filed: Apr. 10, 2018

(65) Prior Publication Data
US 2018/0232960 A1      Aug. 16, 2018

Related U.S. Application Data

(63) Continuation of application No. 14/906,958, filed as application No. PCT/US2014/047664 on Jul. 22, 2014, now Pat. No. 9,972,142.
(Continued)

(51) Int. Cl.
*G01M 17/00*    (2006.01)
*G07C 5/00*     (2006.01)
(Continued)

(52) U.S. Cl.
CPC ............ *G07C 5/008* (2013.01); *B64D 45/00* (2013.01); *B64F 5/60* (2017.01); *G07C 5/085* (2013.01); *B64D 2045/0085* (2013.01)

(58) Field of Classification Search
CPC .......... G07C 5/008; G07C 5/085; B64F 5/60; B64D 45/00; B64D 2405/0085
(Continued)

(56) References Cited

U.S. PATENT DOCUMENTS

| 6,181,990 | B1 * | 1/2001 | Grabowsky | B64D 47/00 701/14 |
| 7,636,568 | B2 * | 12/2009 | Gould | B64D 47/00 455/431 |

(Continued)

*Primary Examiner* — Shardul D Patel
(74) *Attorney, Agent, or Firm* — LKGlobal | Lorenz & Kopf, LLP

(57) ABSTRACT

Systems, methods, and computers for aircraft are provided. A system includes a portable device and an on-board computer for an aircraft. The on-board computer is configured to record preliminary squawk events that occur while the aircraft is in flight for potential corrective action. The portable device is configured to communicate with the on-board-computer and is configured for: receiving—from the on-board computer—preliminary squawk events that occur while the aircraft is in flight; presenting the preliminary squawk events; receiving approval inputs that indicate approved squawk events of the preliminary squawk events; and generating a squawk list that includes each of the approved squawk events to be investigated for corrective action after the flight.

19 Claims, 14 Drawing Sheets

Related U.S. Application Data

(60) Provisional application No. 61/857,279, filed on Jul. 23, 2013.

(51) Int. Cl.
*G07C 5/08* (2006.01)
*B64D 45/00* (2006.01)
*B64F 5/60* (2017.01)

(58) Field of Classification Search
USPC ....... 701/14, 33.4; 340/853.2; 455/41.2, 430
See application file for complete search history.

(56) References Cited

U.S. PATENT DOCUMENTS

| | | | | |
|---|---|---|---|---|
| 7,788,002 B2 * | 8/2010 | Yukawa | ............. | G05B 23/0267 |
| | | | | 340/853.2 |
| 8,732,233 B2 * | 5/2014 | Allen | ................... | G08G 5/0021 |
| | | | | 701/14 |
| 2010/0105329 A1 * | 4/2010 | Durand | ................. | G06F 1/1632 |
| | | | | 455/41.2 |

* cited by examiner

FIG. 6

| N65OGD: Logs | | Flight Log: KLBB - KSAV 26 Jul 2012 | Approve/Disapprove CAS Messages |
|---|---|---|---|
| KLBB→KSAV 26 Jul 2012, 15:02 | CAS: 30 Dsc: 0 | Priority: Caution, Message: L-R BAS Off Count 1, Phase: Taxi, status: INAC, Time: 8:10 GMT | › |
| KMAF→KSAV 25 Jul 2012, 23:00 | CAS: 34 Dsc: 0 | | |
| KIAG→KSAV 25 Jul 2012, 15:47 | CAS: 37 Dsc: 0 | Priority: Caution, Message: L-R Blood Pressure Low Count 1, Phase: Taxi, status: INAC, Time: 8:10 GMT | › |
| KHUT→KSAV 24 Jul 2012, 14:00 | CAS: 36 Dsc: 0 | Priority: Caution, Message: Stall Protection Unavailable Count 2, Phase: PreFlight, status: INAC, Time: 14:53 GMT | |
| KHUT→KSAV 24 Jul 2012, 14:40 | CAS: 0 Dsc: 0 | Priority: Caution, Message: FCS Maintenance Required Count 1, Phase: PreFlight, status: ACTV, Time: 16:13 GMT | |
| KSAV→KHUT 24 Jul 2012, 12:06 | CAS: 29 Dsc: 0 | | |
| KRIC→KSAV 20 Jul 2012, 10:36 | CAS: 0 Dsc: 0 | Priority: Caution, Message: EBHA Power Off Count 1, Phase: PreFlight, status: ACTV, Time: 16:13 GMT | |
| KSAV→KSAV 22 Jun 2012, 12:00 | CAS: 0 Dsc: 0 | Priority: Caution, Message: Air Data Probe 1 Heat Fail Count 2, Phase: PreFlight, status: INAC, Time: 14:53 GMT | |
| KSAV→KAFW 21 Jun 2012, 11:30 | CAS: 0 Dsc: 0 | | |
| KSAV→KAVL 20 Jun 2012, 12:03 | CAS: 0 Dsc: 0 | Priority: Caution, Message: Air Data Probe 3 Heat Fail Count 2, Phase: PreFlight, status: INAC, Time: 14:53 GMT | |
| KSAV→KBUF 19 Jun 2012, 21:30 | CAS: 0 Dsc: 0 | Priority: Caution, Message: Air Data Probe 2 Heat Fail Count 2, Phase: PreFlight, status: INAC, Time: 14:53 GMT | |
| KSAV→KSAV 19 Jun 2012, 13:52 | CAS: 0 Dsc: 0 | | |
| KSAV→KLIT 18 Jun 2012, 20:00 | CAS: 0 Dsc: 0 | Priority: Caution, Message: Air Data Probe 4 Heat Fail Count 2, Phase: PreFlight, status: INAC, Time: 14:53 GMT | |
| KSAV→KTUL 18 Jun 2012, 12:28 | CAS: 39 Dsc: 0 | | |
| KSAV→KAMA 14 Jun 2012, 20:53 | CAS: 0 Dsc: 0 | | |

FIG. 8

| N65OGD: Logs | | Flight Log: KLBB - KSAV 26 Jul 2012 | View Discrepancies |
|---|---|---|---|
| KLBB→KSAV<br>26 Jul 2012, 15:02 | CAS: 30<br>Disc: 0 | Review Discrepancies | Add Discrepancy |
| KMAF→KSAV<br>25 Jul 2012, 23:00 | CAS: 34<br>Disc: 0 | Air conditioning Cabin pressurization control system 2 Cabin pressure leak rate too high, Remarks: Remark | Delete  > |
| KIAG→KSAV<br>25 Jul 2012, 15:47 | CAS: 37<br>Disc: 0 | | |
| KHUT→KSAV<br>24 Jul 2012, 14:00 | CAS: 36<br>Disc: 0 | | |
| KHUT→KSAV<br>24 Jul 2012, 14:40 | CAS: 0<br>Disc: 0 | | |
| KSAV→KHUT<br>24 Jul 2012, 12:06 | CAS: 29<br>Disc: 0 | | |
| KRIC→KSAV<br>20 Jul 2012, 10:36 | CAS: 0<br>Disc: 0 | | |
| KSAV→KSAV<br>22 Jun 2012, 12:00 | CAS: 0<br>Disc: 0 | | |
| KSAV→KAFW<br>21 Jun 2012, 11:30 | CAS: 0<br>Disc: 0 | | |
| KSAV→KAVL<br>20 Jun 2012, 12:03 | CAS: 0<br>Disc: 0 | | |
| KSAV→KBUF<br>19 Jun 2012, 21:30 | CAS: 0<br>Disc: 0 | | |
| KSAV→KSAV<br>19 Jun 2012, 13:52 | CAS: 0<br>Disc: 0 | | |
| KSAV→KLIT<br>18 Jun 2012, 20:00 | CAS: 0<br>Disc: 0 | | |
| KSAV→KTUL<br>18 Jun 2012, 12:28 | CAS: 39<br>Disc: 0 | | |
| KSAV→KAMA<br>14 Jun 2012, 20:53 | CAS: 0<br>Disc: 0 | Home | Flight Logs |

FIG. 9

N65OGD: Logs

Flight Log: KLBB - KSAV, 26 Jul 2012

| Route | CAS | Disc |
|---|---|---|
| KLBB→KSAV 26 Jul 2012, 15:02 | CAS: 30 | Disc: 0 |
| KMAF→KSAV 25 Jul 2012, 23:00 | CAS: 34 | Disc: 0 |
| KIAG→KSAV 25 Jul 2012, 15:47 | CAS: 37 | Disc: 0 |
| KHUT→KSAV 24 Jul 2012, 14:00 | CAS: 36 | Disc: 0 |
| KHUT→KSAV 24 Jul 2012, 14:40 | CAS: 0 | Disc: 0 |
| KSAV→KHUT 24 Jul 2012, 12:06 | CAS: 29 | Disc: 0 |
| KRIC→KSAV 20 Jul 2012, 10:36 | CAS: 0 | Disc: 0 |
| KSAV→KSAV 22 Jun 2012, 12:00 | CAS: 0 | Disc: 0 |
| KSAV→KAFW 21 Jun 2012, 11:30 | CAS: 0 | Disc: 0 |
| KSAV→KAVL 20 Jun 2012, 12:03 | CAS: 0 | Disc: 0 |
| KSAV→KBUF 19 Jun 2012, 21:30 | CAS: 0 | Disc: 0 |
| KSAV→KSAV 19 Jun 2012, 13:52 | CAS: 0 | Disc: 0 |
| KSAV→KLIT 18 Jun 2012, 20:00 | CAS: 39 | Disc: 0 |
| KSAV→KTUL 18 Jun 2012, 12:28 | CAS: 0 | Disc: 0 |
| KSAV→KAMA 14 Jun 2012, 20:53 | CAS: 0 | Disc: 0 |

CAS Messages: xxxxxxx    Edits    Approve

| | | | |
|---|---|---|---|
| Log: | 1 | APU Hours: | xxxx |
| Departure Date: | 7/26/2012 | Arrival Date: | 7/26/2012 |
| Departure Airport: | KLBB | Arrival Airport: | KSAV |
| Block Out Time: | 15:02 GMT | Flight Off: | 18:47 GMT |
| Flight On: | 00:00 GMT | Block In Time: | 19:03 GMT |

Ending Fuel (lbs): 0

Approve Flight Log

This will approve this flight log to be sent to CMP. Please note that flight logs can no longer be edited within this application once they are approved.

Cancel     Ok

First Officer: Unknown

Passengers: 0

Advisory: 21    Info: 0

Remarks

Home    Flight Logs

FIG. 12

METHODS, SYSTEMS AND APPARATUS FOR AUTOMATED GENERATION OF A FLIGHT LOG AND A SQUAWK LIST FILE

CROSS REFERENCE TO RELATED APPLICATIONS

This is a continuation of U.S. patent application Ser. No. 14/906,958, filed on Jan. 22, 2016, which is a U.S. National-Stage entry under 35 U.S.C. § 371 based on International Application No. PCT/US2014/047664, filed on Jul. 22, 2014, and which claims priority to U.S. Provisional Patent Application No. 61/857,279, filed Jul. 23, 2014, which are all incorporated in their entirety by reference.

TECHNICAL FIELD

Embodiments of the present invention generally relate to aircraft, and more particularly relate to methods, systems and apparatus for automated generation of a flight log and a squawk list file.

BACKGROUND OF THE INVENTION

Modern aircraft are often equipped with sophisticated systems, such as flight data recorders, which report information and store in-flight data. In addition, ground-based systems support aircraft maintenance.

When an aircraft is in flight, it can be difficult to detect when sub-systems or components of an aircraft begin to operate abnormally, and/or to correctly diagnose the specific source that is causing that sub-system or component to operate abnormally. While these abnormal operating conditions may persist after the aircraft has landed, in many cases that is not true, which can make it even more difficult to correctly diagnose the specific source that is causing that sub-system or component to operate abnormally.

There is a need for methods and systems for monitoring the health of an aircraft and the aircraft's various components and sub-systems. It would be desirable to provide methods and systems that can automatically detect abnormal conditions that indicate when one or more sub-systems or components of an aircraft have experienced a degradation in performance. It would also be desirable if such methods and systems can identify the specific source(s) within those particular sub-systems or components that are causing the degradation in performance so that corrective actions can be taken with respect to the identified sub-systems or components prior to fault or failure. It would also be desirable if such methods and systems execute automatically and do not require crew intervention. It would also be desirable to provide methods and systems that can be used to create reports that automatically document details regarding events that happened during the flight. Furthermore, other desirable features and characteristics of the present invention will become apparent from the subsequent detailed description and the appended claims, taken in conjunction with the accompanying drawings and the foregoing technical field and background.

SUMMARY

The disclosed embodiments relate to methods, systems and wireless communication devices for automated generation a flight log and a squawk list file. A computer records a preliminary flight log data file (PFLDF), records squawk events that occur while an aircraft is in flight, and automatically generates a preliminary squawk list file (PSLF) that includes a plurality of squawk events. A wireless communication device includes a processor configured to execute a software application, a display configured to display a graphical user interface that presents each squawk event from the PSLF for review, and an input system configured to receive inputs comprising an input for each particular squawk event in the PSLF. These inputs for each particular squawk event in the PSLF can be an edit input, an approval input, or a removal input. In some implementations, the inputs can also include an addition input that specifies a new squawk event. When all squawk events in the PSLF have been reviewed, the processor executes the software application to generate a final flight log and a final squawk list file (FSLF) that includes each of the squawk events from the PSLF that have been reviewed and approved for inclusion as squawk events to be investigated for corrective action after the flight.

DESCRIPTION OF THE DRAWINGS

Embodiments of the present invention will hereinafter be described in conjunction with the following drawing figures, wherein like numerals denote like elements.

FIGS. 6-12 are examples screens that can be displayed as part of a graphical user interface (GUI) that can be displayed at the wireless communication device in accordance with the disclosed embodiments.

DESCRIPTION OF EXEMPLARY EMBODIMENTS

Figure 1:
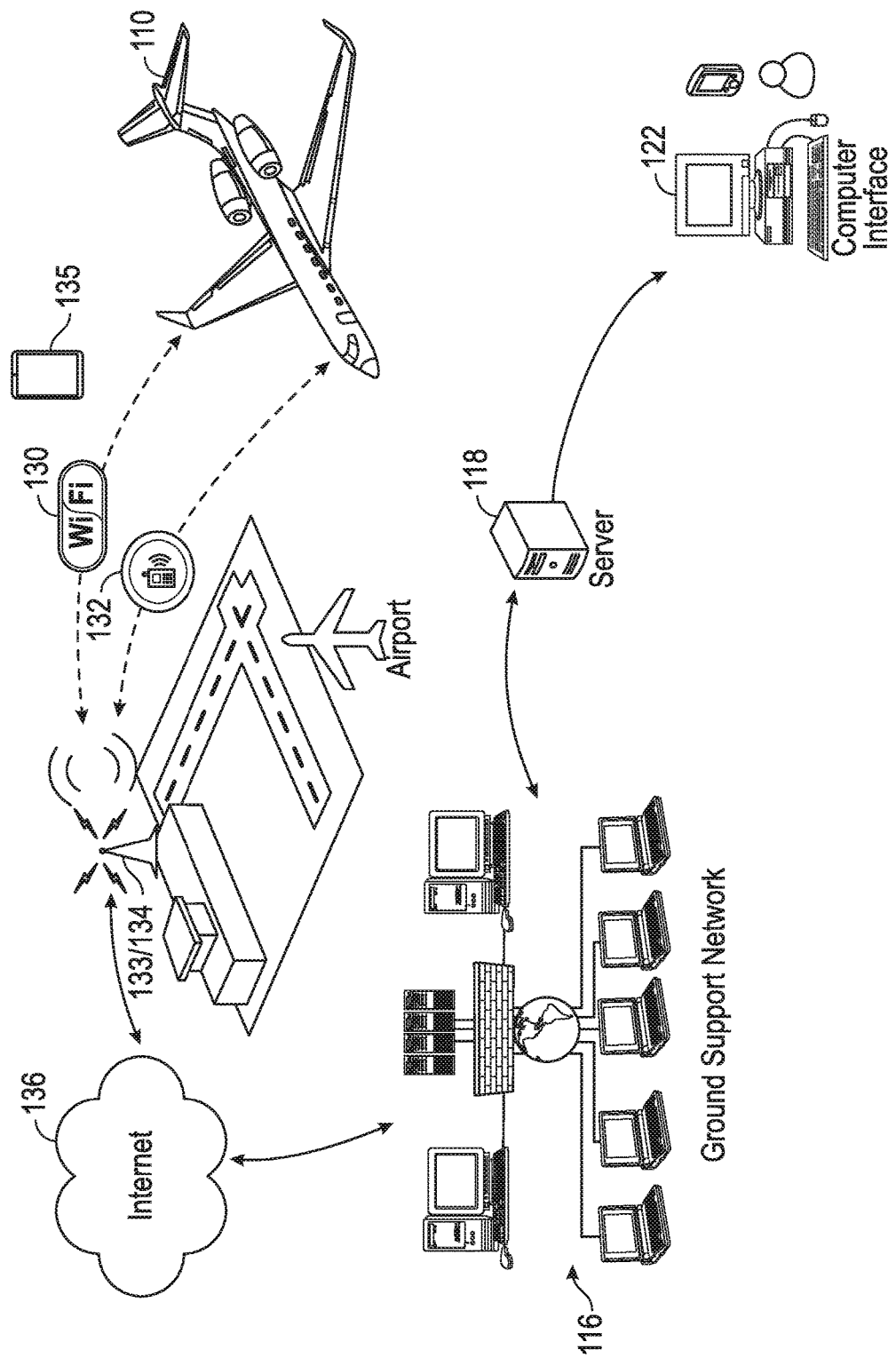
FIG. 1 is an integrated system for aircraft health and trend monitoring of an aircraft and the aircraft's various sub-systems in accordance with some of the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

The disclosed embodiments relate to methods, systems and computer program products for automated generation and verification of a flight log (also referred to below as a "flight log data" or "electronic flight log") and squawk list file (also referred to below as a "squawk list"). The disclosed embodiments can be used to automatically populate flight log and squawk list file for the pilot after the aircraft lands. The disclosed embodiments can eliminate the need for the pilot to manually, hand-enter and update data to create/update flight log and squawk list information thereby reducing pilot work load post-flight.

The aircraft includes an onboard computer having a processor that executes program modules of an Aircraft Health and Trend Monitoring Unit (AHTMU) throughout the flight to collect data that is used to generate a preliminary flight log file and a preliminary squawk list file.

At a later time, a person (e.g., pilot/maintenance person) can then run a software application that executes on a wireless communication device (WCD), such as a tablet computing device (e.g., an iPad) or smartphone. When the software application runs/executes, it retrieves the preliminary flight log file and the preliminary squawk list file (that was created throughout the flight) over a wireless communication link that has been established with the on-board computer. The software application extracts data from the preliminary flight log file and the preliminary squawk list file, and populates various fields of a graphical user interface (GUI) that is displayed on a display of the WCD. The GUI presents pertinent data required by the pilot for updating the information contained in the preliminary flight log file and the preliminary squawk list file.

The pilot can then review each squawk event presented on the GUI. During this review process, for each squawk event presented on the GUI, the pilot can use an input/output device of the tablet computer to input additional information (if necessary) including new squawk events, change or update information (if necessary) for particular squawk events, remove/delete particular squawk events, and then eventually approve each squawk event when that squawk event is determined to be acceptable (e.g., accurate or complete or ready for processing).

Once all squawk events from the preliminary flight log file and the preliminary squawk list file have been presented, reviewed (e.g., changed or updated) and then approved, the pilot can approve the revised flight log and squawk list file to generate a final flight log and squawk list file (e.g., a single .xml file) that has been approved by the pilot FIG. 1 is an integrated system 100 for health and trend monitoring of an aircraft 110 and the aircraft's various sub-systems in accordance with some of the disclosed embodiments. As used herein, the term "health monitoring" refers to the process of collecting and evaluating relevant parameters and/or measured data to determine the state, status, or numerical output value of a component and/or sub-system in any given time period. As used herein, the term "trend monitoring" refers to the process of collecting and evaluating relevant parameters and/or measured data to determine the state, status, or numerical output value of a component and/or sub-system in any given time period in order to predict, estimate, or trend, said state, status, or numerical output value of a component and/or sub-system at a future time.

The system includes an aircraft 110, a WLAN access point 133, a cellular base station 134, a wireless communication device (WCD) 135, a ground support network (GSN) 116, a server 118 and a computer interface 122 located at aircraft monitoring center of either an operator or the aircraft manufacturer.

In response to various trigger events or Crew Alerting System (CAS) messages, the aircraft 110 generates and communicates information to the WLAN access point 133 via a WLAN communication link 130 or to a cellular base station 134 via a cellular communication link 132. The information can include, among other things, measured data for relevant variables, CAS messages, and measured data for relevant parameters associated with each of the relevant variables and CAS messages. The WLAN access point 133 or the cellular base station 134 communicates the parameter files via a wired link over the Internet 136 to the ground support network 116. The ground support network 116 is coupled to the server 118 via a communication link.

The WCD 135 can be The WCD 135 (also referred to below simply as a device 135) can be any type of electronics device that is capable of wireless communication with a network, and includes elements such as a transceiver, computer readable medium, processor, and a display that are not illustrated since those elements are known in the art. The WCD 135 can be, for example, any number of different portable wireless communications devices, such as personal or tablet computers, cellular telephones, smartphones, etc.

In the embodiment of FIG. 1, the WCD 135 is a smartphone. In this regard, it is noted that as used herein, a smartphone refers to a mobile telephone built on a mobile operating system with more advanced computing capability and connectivity than a feature phone. In addition to digital voice service, a modern smartphone has the capability of running applications and connecting to the Internet, and can provide a user with access to a variety of additional applications and services such as text messaging, e-mail, Web browsing, still and video cameras, MP3 player and video playback, etc. Many smartphones can typically include built in applications that can provide web browser functionality that can be used display standard web pages as well as mobile-optimized sites, e-mail functionality, voice recognition, clocks/watches/timers, calculator functionality, personal digital assistant (PDA) functionality including calendar functionality and a contact database, portable media player functionality, low-end compact digital camera functionality, pocket video camera functionality, navigation functionality (cellular or GPS), etc. In addition to their built-in functions, smartphones are capable of running an ever growing list of free and paid applications that are too extensive to list comprehensively.

The WCD 135 is WLAN-enabled and Bluetooth-enabled meaning that it includes for communicating according to either of those specifications. Because the WCD 135 is a portable it can be carried close to the aircraft 110 or far away from the aircraft 110. Depending upon its proximity to the aircraft 110, the WCD 135 can in some cases establish a wireless connection with the wireless communication interfaces 271 when it is within communication range of the wireless communication interfaces 271. For example, in some cases, the WCD 135 can be far enough away from the aircraft 110 such that it is not possible for it to establish a direct wireless connection to short-range wireless interfaces such as Bluetooth or WLAN interfaces that are implemented at the wireless communication network interface module 271. By contrast, at other times, the WCD 135 can be located close enough to the aircraft 110 to establish a wireless connection to the onboard computer 210 over a short-range wireless communication link. When the WCD 135 is coupled to the onboard computer 210 via a wireless connection with the wireless communication interfaces 271, the WCD 135 can transmit information to the onboard computer 210 or receive information from the onboard computer 210 as data packets (e.g., as IP packets) via a USB connection or via a Bluetooth or WLAN link to corresponding interfaces implemented at block 271

The ground support network 116 is operated by a third party. The ground support network 116 includes several health management algorithms that are used to process data included in the parameter files. Once the data from the parameter files is processed using the appropriate health management algorithms, the ground support network 116 generates web pages that are provided to the server 118. The web pages include information regarding aircraft health and/or fleet health. The web pages can include information stored in parameter files that are communicated from the aircraft 110 to the ground support network 116. The web pages can also include information stored in inspection files generated at the ground support network 116 as well as information that identifies elements of the aircraft, such as sub-systems (or components thereof), which need to be inspected.

The server 118 serves the web pages from the ground support network 116 to a computer that is coupled to the computer interface 122 so that the web pages can be displayed.

The computer interface 122 allows communication to the ground support network 116, for example from a system operator and/or another computer system, and can be implemented using any suitable method and apparatus. This way, the information generated at the ground support network 116 can be viewed by personnel at a monitoring station on the computer interface 122 by an operator. The computer interface 122 can include one or more network interfaces to communicate to other systems or components, one or more terminal interfaces to communicate with technicians, and one or more interfaces to connect to the processor 116-1 or memory 116-2 of the ground support network 116.

Figure 2A:
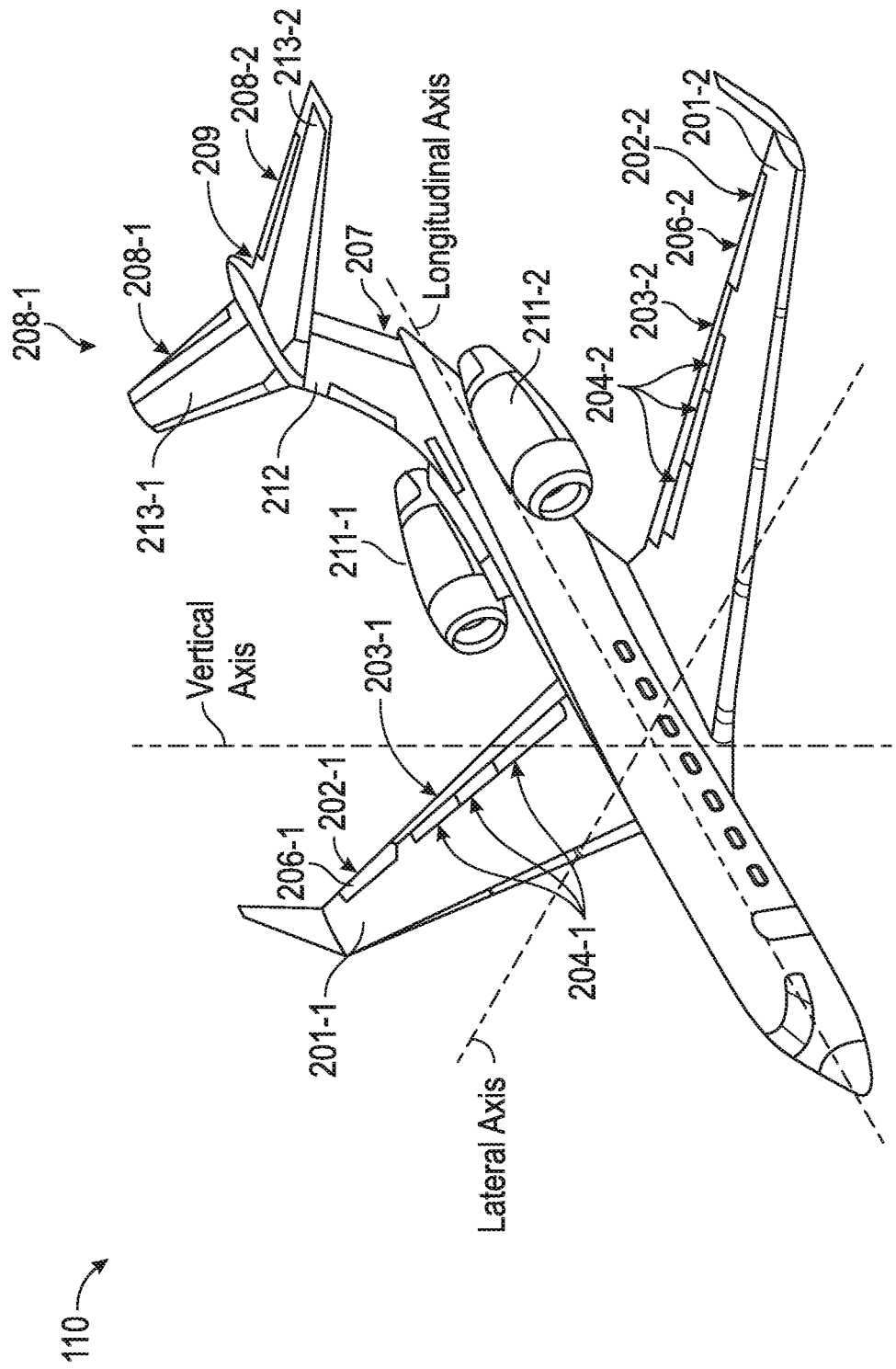
FIG. 2A is a perspective view of an aircraft that can be used in accordance with some of the disclosed embodiments.

FIG. 2A is a perspective view of an aircraft 110 that can be used in accordance with some of the disclosed embodiments. In accordance with one non-limiting implementation of the disclosed embodiments, the aircraft 110 includes a fuselage, two main wings 201-1, 201-2, a vertical stabilizer 212, an elevator 209 that includes two horizontal stabilizers 213-1 and 213-2 in a T-tail stabilizer configuration, and two jet engines 211-1, 211-2. For flight control, the two main wings 201-1, 201-2 each have an aileron 202-1, 202-2, an aileron trim tab 206-1, 206-2, a spoiler 204-1, 204-2 and a flap 203-1, 203-2, the vertical stabilizer 212 includes a rudder 207, and the aircraft's horizontal stabilizers (or tail) 213-1, 213-2 each include an elevator trim tab 208-1, 208-2. Although not shown in FIG. 1, the aircraft 110 also includes an onboard computer, aircraft instrumentation and various control systems as will now be described with reference to FIG. 2B.

Figure 2B:
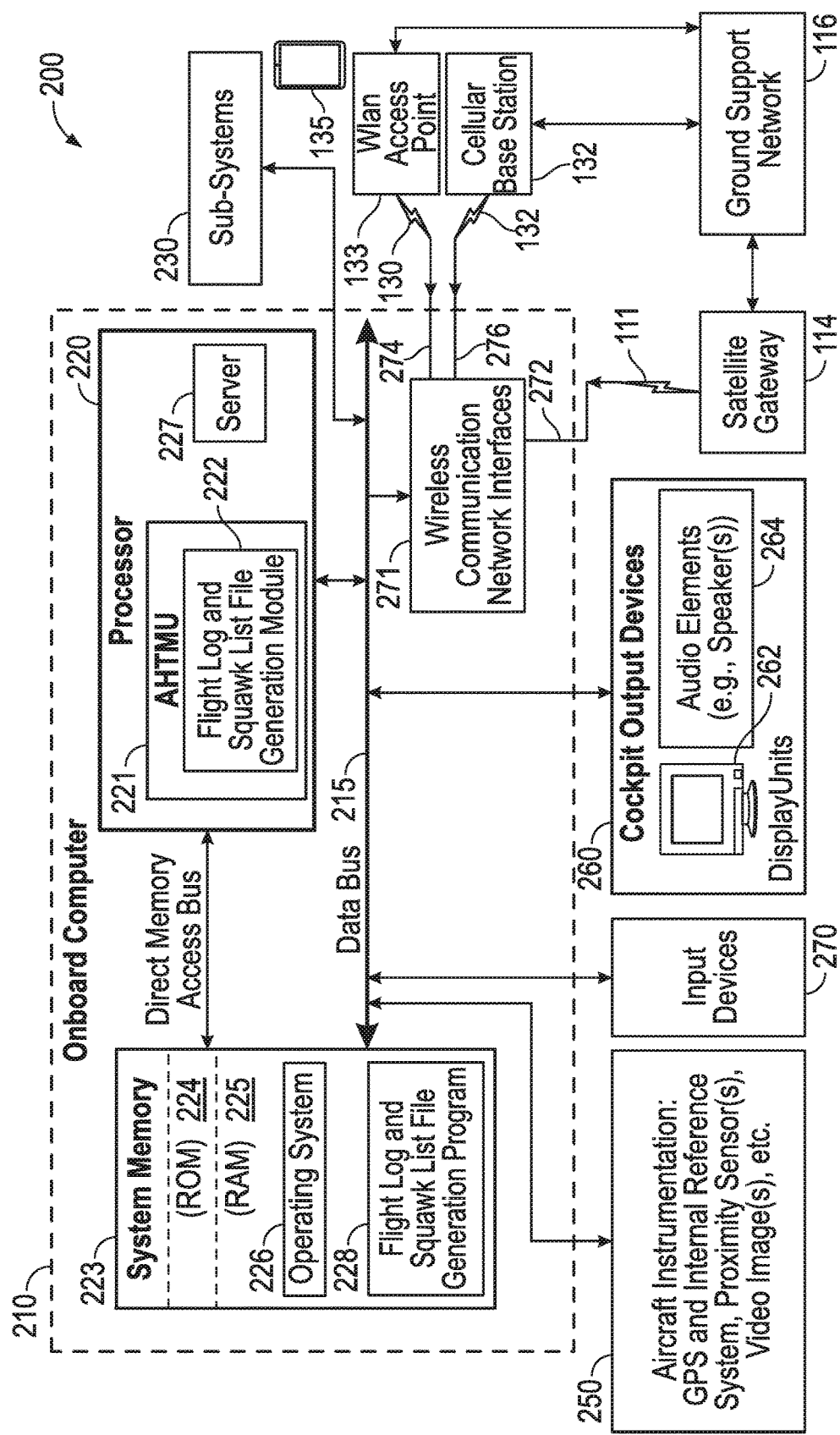
FIG. 2B is a block diagram of an Aircraft Health and Trend Monitoring system in accordance with an exemplary implementation of the disclosed embodiments.

FIG. 2B is a block diagram of an Aircraft Health and Trend Monitoring (AHTM) system 200 in accordance with an exemplary implementation of the disclosed embodiments. Part of the system 200 is implemented within an aircraft 110 for acquiring data. This data can include measured data for one or more relevant variables, measured data for relevant parameters associated with the one or more relevant variables, CAS messages and measured data for relevant parameters associated with the one or more CAS messages, flight log data, flight log files, squawk events, and squawk list files. This data can then be communicated from the aircraft 110 to the ground support network 116 and used for monitoring the health of one or more elements (e.g., sub-systems 230 or components of such sub-systems) of the aircraft 110, and/or for monitoring trending behavior exhibited by one or more elements of the aircraft 110. As shown, the system 200 includes various sub-systems 230 of the aircraft 110.

The aircraft 110 portion of the system 200 includes an onboard computer 210, various sub-systems 230, aircraft instrumentation 250, cockpit output devices 260 (e.g., display units 262 such as control display units, multifunction displays (MFDs), etc., audio elements 264, such as speakers, etc.), and various input devices 270 such as a keypad which includes a cursor controlled device, and one or more touchscreen input devices which can be implemented as part of the display units.

The aircraft instrumentation 250 can include, for example, the elements of a Global Position System (GPS), which provides GPS information regarding the position and speed of the aircraft, and elements of an Inertial Reference System (IRS), proximity sensors, switches, relays, video imagers, etc. In general, the IRS is a self-contained navigation system that includes inertial detectors, such as accelerometers, and rotation sensors (e.g., gyroscopes) to automatically and continuously calculate the aircraft's position, orientation, heading and velocity (direction and speed of movement) without the need for external references once it has been initialized.

The cockpit output devices 260 can include display units 262 and audio elements 264. The display units 262 can be implemented using any man-machine interface, including but not limited to a screen, a display or other graphical user interface (UI). The audio elements 264 can include speakers and circuitry for driving the speakers.

The input devices 270 can generally include, for example, any switch, selection button, keypad, keyboard, pointing devices (such as a cursor controlled device or mouse) and/or touch-based input devices including touch screen display(s) which include selection buttons that can be selected using a finger, pen, stylus, etc.

The onboard computer 210 includes a data bus 215, a processor 220, system memory 223, and wireless communication network interfaces 271.

The data bus 215 serves to transmit programs, data, status and other information or signals between the various elements of FIG. 2B. The data bus 215 is used to carry information communicated between the processor 220, the system memory 223, the various sub-systems 230, aircraft instrumentation 250, cockpit output devices 260, various input devices 270, and wireless communication network interfaces 271. The data bus 215 can be implemented using any suitable physical or logical means of connecting the on-board computer 210 to at least the external and internal elements mentioned above. This includes, but is not limited to, direct hard-wired connections, fiber optics, and infrared and wireless bus technologies.

The processor 220 performs the computation and control functions of the computer system 210, and may comprise any type of processor 220 or multiple processors 220, single integrated circuits such as a microprocessor, or any suitable number of integrated circuit devices and/or circuit boards working in cooperation to accomplish the functions of a processing unit.

It should be understood that the system memory 223 may be a single type of memory component, or it may be composed of many different types of memory components. The system memory 223 can includes non-volatile memory (such as ROM 224, flash memory, etc.), volatile memory (such as RAM 225), or some combination of the two. The RAM 225 can be any type of suitable random access memory including the various types of dynamic random access memory (DRAM) such as SDRAM, the various types of static RAM (SRAM). The RAM 225 includes an operating system 226, and flight log and squawk list file generation programs 228. The RAM 225 stores executable code for one or more flight log and squawk list file generation programs 228. The flight log and squawk list file generation programs 228 (stored in system memory 223) that can be loaded (via Direct Memory Access (DMA)) at the processor 220 and executed at processor 220 to implement a flight log and squawk list file generation module 222 at processor 220.

The processor 220 executes program modules of an Aircraft Health and Trend Monitoring Unit (AHTMU) 221 throughout the flight to collect data. As will be explained below, the processor 220 executes the flight log and squawk list file generation programs 228 and uses the data collected by the AHTMU 221 to generate a preliminary flight log file and a preliminary squawk list file that can be used at a wireless communication device to generate a final flight log and a final squawk list file that can then be provided to the ground support network 116 and used for conducting health and trend monitoring for one or more aircraft sub-systems (or components thereof).

As used herein, a "flight log" can refer to a record of each flight that includes information such as date of the flight, flight leg, pilot name, co-pilot name, origin airport, destination airport, block-in time and block-out time, takeoff time, landing time, indication of whether it was a day flight or a night flight, fuel burned, engine cycles, APU cycles, etc.

As used herein, a "squawk list" can refer to a list of squawk events that are recorded during a specific flight. Squawk events generally require a corrective action within a certain time period, depending on the severity of the particular squawk event. A squawk event can be either a discrepancy or an event related to a CAS message (CAS messages are described in detail above). A discrepancy can be any issue arising on an aircraft that requires corrective action. A discrepancy refers to any type of squawk event that is not related to a CAS message, and differs from a CAS message in that discrepancies can be manually entered into the squawk list by a person, such as a pilot or maintenance personnel, either pre-flight before takeoff, during flight or post-flight after the aircraft has landed during a time period between landing and a final approval of the squawk list. By contrast, CAS messages are automatically generated during flight and added to the squawk list without human intervention.

The processor 220 is also used to implement a server module 227 that is sometimes referred to as a cabin server. As will be described below with reference to FIG. 4, the server module 227 can provide information (including the preliminary flight log file and a preliminary squawk list file) to external computers and devices, and can receive information from external computers and devices.

In addition, it is noted that in some embodiments, the system memory 223 and the processor 220 may be distributed across several different on-board computers that collectively comprise the on-board computer system 210.

The wireless communication network interfaces 271 are operatively and communicatively coupled antennas 272, 274, 276 that are external to the on-board computer 210. The antennas include a satellite antenna 272 that can be used to communicate information with a satellite gateway 114 over a satellite communication link, a WLAN antenna 274 that can be used to communicate information with a WLAN access point 133 over a WLAN communication link, and a cellular network antenna 276 that can be used to communicate information to/from a cellular base station 134 over a cellular communication link. The satellite gateway 114, the WLAN access point 133, and the cellular base station 134 can all be coupled to other networks, including the Internet, so that information can be exchanged with remote computers.

Figure 2C:
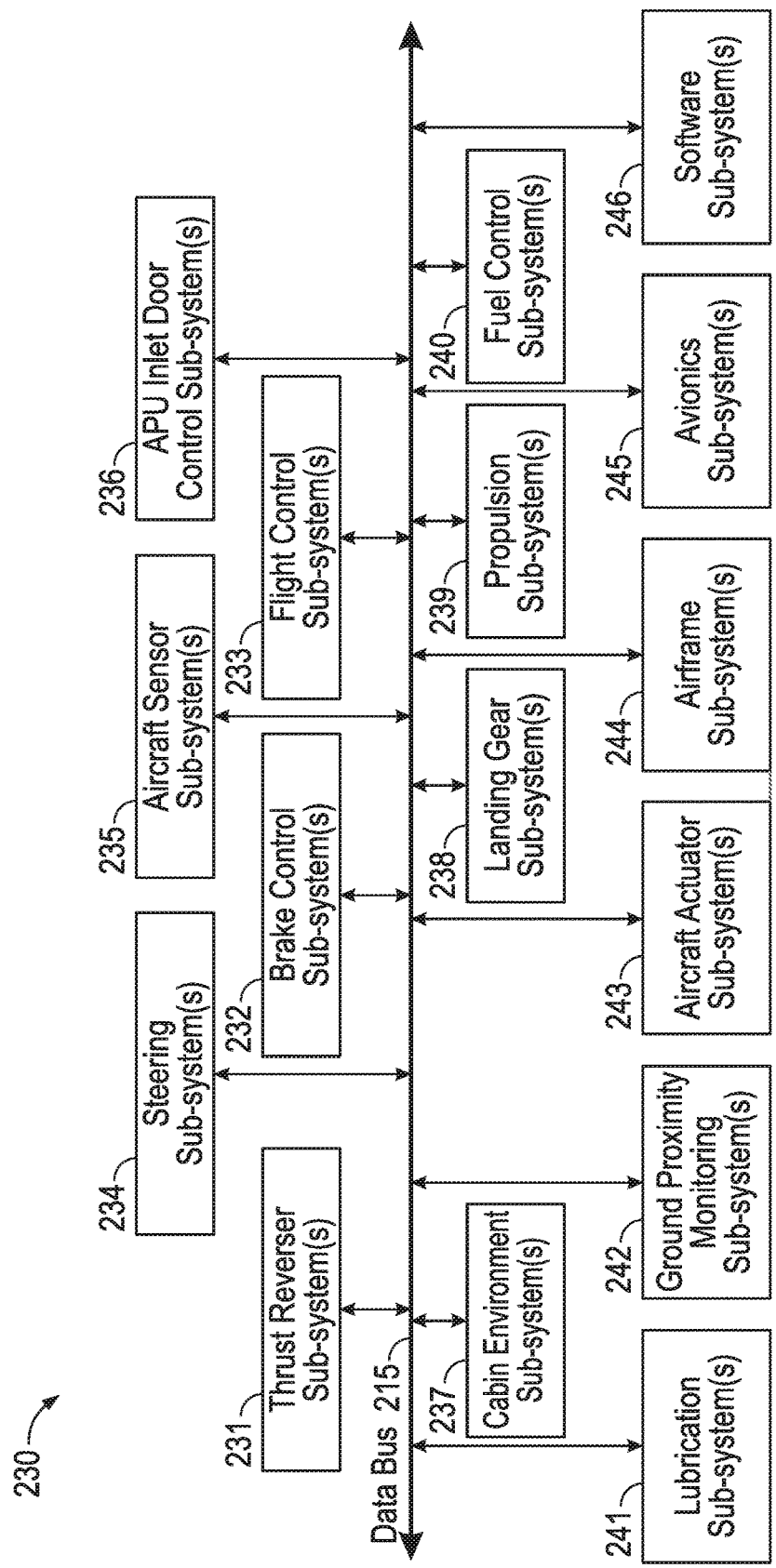
FIG. 2C is a block diagram of some of an aircraft's various sub-systems in accordance with an exemplary implementation of the disclosed embodiments.

FIG. 2C is a block diagram of various sub-systems 230 of an aircraft 110 in accordance with an exemplary implementation of the disclosed embodiments. In one exemplary, non-limiting implementation, the various sub-system(s) 231-246 include a thrust reverser control sub-system(s) 231, a brake control sub-system(s) 232, a flight control sub-system(s) 233, a steering control sub-system(s) 234, aircraft sensor control sub-system(s) 235, an APU inlet door control sub-system(s) 236, a cabin environment control sub-system(s) 237, a landing gear control sub-system(s) 238, propulsion sub-system(s) 239, fuel control sub-system(s) 240, lubrication sub-system(s) 241, ground proximity monitoring sub-system(s) 242, aircraft actuator sub-system(s) 243, airframe sub-system(s) 244, avionics sub-system(s) 245, software sub-system(s) 246. The sub-system(s) 230-246 that are illustrated in FIG. 2B are exemplary only, and in other embodiments various other sub-system(s) can be included such as, for example, air data sub-system(s), auto flight sub-system(s), engine/powerplant/ignition sub-system(s), electrical power sub-system(s), communications sub-system(s), fire protection sub-system(s), hydraulic power sub-system(s), ice and rain protection sub-system(s), navigation sub-system(s), oxygen sub-system(s), pneumatic sub-system(s), information sub-system(s), exhaust sub-system(s), etc.

Although not illustrated in FIG. 2C, those skilled in the art will appreciate that each of the various sub-systems can include one or more components. In addition, each of the various sub-systems can each include one or more sensors to facilitate measurement and generation of data pertaining to operation of that sub-system of the aircraft 110 (and/or a component of that sub-system), to assist in performing diagnostics and health monitoring of one or more sub-systems, etc. Each sensor can generate data that is used to generate information that can be included in squawk list files that are generated by the flight log and squawk list file generation module 222. In general, a "sensor" is a device that measures a physical quantity and converts it into a signal which can be read by an observer or by an instrument. In general, sensors can be used to sense light, motion, temperature, magnetic fields, gravitational forces, humidity, vibration, pressure, electrical fields, current, voltage, sound, and other physical aspects of an environment. Non-limiting examples of sensors can include acoustic sensors (e.g., sound, microphone, seismometer, accelerometer, etc.), vibration sensors, vehicle sensors (e.g., air speed indicator, altimeter, attitude indicator, gyroscope, inertial reference unit, magnetic compass, navigation instrument sensor, speed sensors, throttle position sensor, variable reluctance sensor, viscometer, wheel speed sensor, Yaw rate sensor, etc.), chemical sensors/detectors, electric current sensors, electric potential sensors, magnetic sensors, radio frequency sensors, environmental sensors, fluid flow sensors, position, angle, displacement, distance, speed, acceleration sensors (e.g., accelerometer, inclinometer, position sensor, rotary encoder, rotary/linear variable differential transformer, tachometer, etc.), optical, light, imaging sensors (e.g., charge-coupled device, infra-red sensor, LED, fiber optic sensors, photodiode, phototransistors, photoelectric sensor, etc.), pressure sensors and gauges, strain gauges, torque sensors, force sensors piezoelectric sensors, density sensors, level sensors, thermal, heat, temperature sensors (e.g., heat flux sensor, thermometer, resistance-based temperature detector, thermistor, thermocouple, etc.), proximity/presence sensors, etc.

Figure 3:
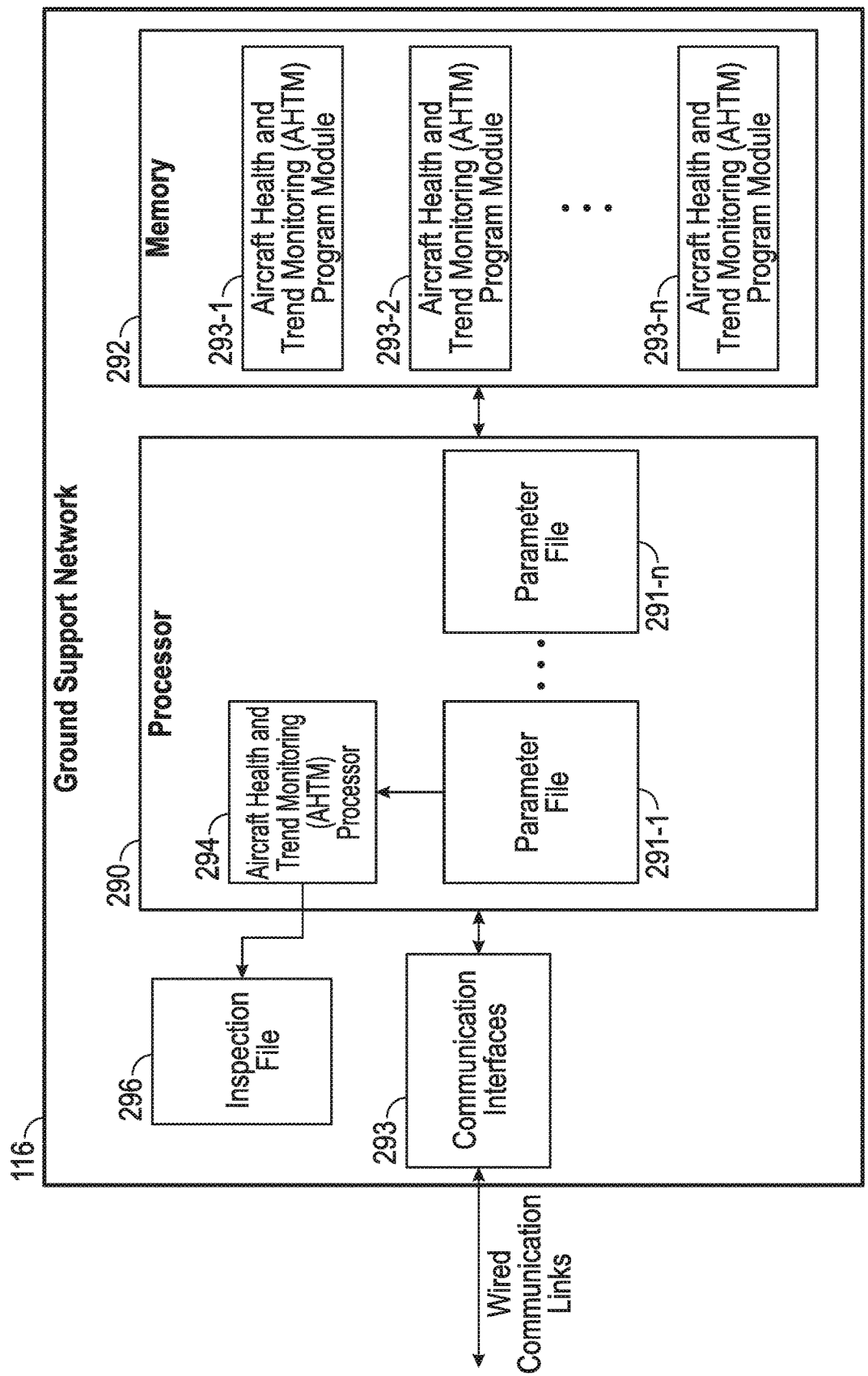
FIG. 3 is a block diagram of portions of a ground support network in accordance with one exemplary implementation of the disclosed embodiments.

FIG. 3 is a block diagram of portions of a Ground support network (GSN) 116 in accordance with one exemplary implementation of the disclosed embodiments. As illustrated in FIG. 3, the ground support network 116 includes a processor 290, memory 292 and communication interfaces 293 that are coupled to various different wired communication links.

The memory 292 can be implemented using any of the memory technologies that are disclosed herein. The memory 292 stores a plurality of Aircraft Health and Trend Monitoring (AHTM) program modules 293-1 . . . 293-n. Each of the AHTM program modules 293 are programmed with computer executable instructions for implementing a particular health and trend monitoring algorithm (HTMA). The memory 292 can store various different AHTM program modules 293 that can be used to implement various different HTMAs via computer executable instructions.

When parameter files 291-1 . . . 291-n are received at the ground support network 116 from the aircraft 110, each parameter file 291 can be loaded at the processor 290 along with a corresponding AHTM program module 293 that corresponds to that particular type of parameter file. When the processor 290 executes the computer executable code of an AHTM program module 293 with respect to measured data included in one of the parameter files 291, an instantiation of an Aircraft Health and Trend Monitoring (AHTM) processor 294 is implemented at the processor 290.

Relevant Variable Embodiments

In accordance with some of the disclosed embodiments, each HTMA is used to analyze measured data for at least one relevant variable (RV) to determine whether the measured data is abnormal (i.e., outside of its upper and/or lower threshold limits) or normal (i.e., within its upper and/or lower threshold limits).

In accordance with these embodiments, when a parameter file 291 is received and loaded at the processor 290 of the ground support network 116, the processor 290 determines which relevant variables are included in the parameter file 291. For each relevant variable, the processor 290 loads and executes an appropriate AHTM program module 290 (that corresponds to the particular relevant variable). For each AHTM program module 290 and parameter file 291, an HTMA then analyzes the measured data for that relevant variable (RV) to determine whether that relevant variable is at an abnormal level (i.e., outside of its upper and/or lower threshold limits). If the measured data for that relevant variable is determined to be abnormal, the HTMA can flag the abnormality and then also further examine measured data for relevant parameters (RPs) that are associated with that particular relevant variable to determine which relevant parameters are most likely causing the relevant variable to be at an abnormal level.

To explain further, each HTMA has at least one relevant variable (RV) associated with it that is used during initial analysis of a particular sub-system of an aircraft or of a component of a particular sub-system. Each relevant variable is influenced or affected by a number of different relevant parameters (RPs). Each of the relevant parameters are also associated with the particular sub-system or component of the aircraft, and help characterize the performance or operational characteristics of that particular sub-system or component. For a particular HTMA, the relevant variables and the relevant parameters for each relevant variable, as well as thresholds (e.g., upper and/or lower thresholds) for each relevant variable and each of its relevant parameters, are pre-defined.

When a relevant variable is determined to be abnormal during execution of a particular HTMA, measured data for each of the relevant parameters corresponding to that relevant variable can then be compared to one or more thresholds, and any relevant parameters that are determined to be outside their respective threshold(s) can then be identified as being a potential cause of the abnormal relevant variable and can then be stored in an inspection file 296. In some implementations, the inspection file 296 can also indicate particular sub-system(s) (or components thereof) that each of the relevant parameters are associated with. This way, those particular sub-system(s) (or components thereof) can be easily identified for further inspection to determine whether they are operating correctly or whether corrective actions need to be taken.

CAS Message Embodiments

Many modern aircraft used Crew Alerting System (CAS) messages to provide engine and aircraft system fault information to the crew. CAS messages are annunciated to the crew based on triggers and logic embedded in the avionics suite. The logic typically contains inputs from all reporting aircraft systems and sub-systems. A CAS message is triggered when the combination of inputs meets the criteria of embedded logic. This could be Boolean or binary type inputs, or floating point parameters. Once the logic has been satisfied, the avionics suite displays a message to the crew in either Red (warning), Amber (caution), or Cyan (advisory). Many CAS messages display failure or fault information to the crew. In these instances when failure or fault information is displayed, it is assumed that the system has experienced an anomaly and a corrective action must be performed to successfully extinguish the CAS message. The system is records all of the CAS parameters at any given time. The CAS parameter value of the message is 0 until the CAS message becomes active. Once active, the value of the CAS parameter value changes from zero to an integer between one (1) and sixty-three (63) depending on what failed. As the CAS messages are recorded, the system is detects when the value of the parameter changes from zero to a non-zero value.

In accordance with some of the other disclosed embodiments, when a CAS message is generated on-board the aircraft 110, the data for relevant parameters (RPs) that are associated with that particular CAS message are automatically measured and stored in a parameter file 291 that is transmitted to the ground support network 116. Aircraft maintenance and engineering personnel can determine based on experience a number of different relevant parameters (RPs) that are the typical triggers for each particular CAS message. As such, for each particular CAS message, relevant parameters and their respective thresholds (e.g., upper and/or lower thresholds for each relevant parameter) can be pre-defined.

When a parameter file 291 is received and loaded at the processor 290 of the ground support network 116, the processor 290 also loads and executes an appropriate AHTM program module 293 (that corresponds to the particular CAS message indicated in the parameter file 291). When the processor 290 executes the HTMA that corresponds to the AHTM program module 293, the measured data for each of the relevant parameters (RPs) that are included in the parameter file 291 are analyzed to determine which of the relevant parameters are at an abnormal level (i.e., outside of its upper and/or lower threshold limits) and thus most likely causing that particular CAS message to be generated. Each of the relevant parameters can be compared to one or more thresholds, and any relevant parameters that are determined to be outside those threshold(s) can be identified as being a potential cause of the CAS message. When the measured data for any relevant parameter is determined to be abnormal, the HTMA can flag the abnormality and the relevant parameters that are outside of their respective threshold(s) can then be stored in an inspection file 296. In some implementations, the inspection file 296 can also indicate particular sub-system(s) (or components thereof) that each of the relevant parameters are associated with. This way, those particular sub-system(s) (or components thereof) can be identified and flagged for further inspection to determine whether they are operating correctly or whether corrective actions need to be taken.

Automated Generation and Verification of a Flight Log and Squawk List File

The disclosed embodiments relate to methods, systems and computer program products for automated generation and verification of a flight log (also referred to below as a "flight log data" or "electronic flight log") and squawk list file (also referred to below as a "squawk list"). The disclosed embodiments can be used to automatically populate flight log and squawk list file for the pilot after the aircraft 110 lands. The disclosed embodiments can eliminate the need for the pilot to manually, hand-enter and update data to create/update flight log and squawk list information thereby reducing pilot work load post flight.

Figure 4:
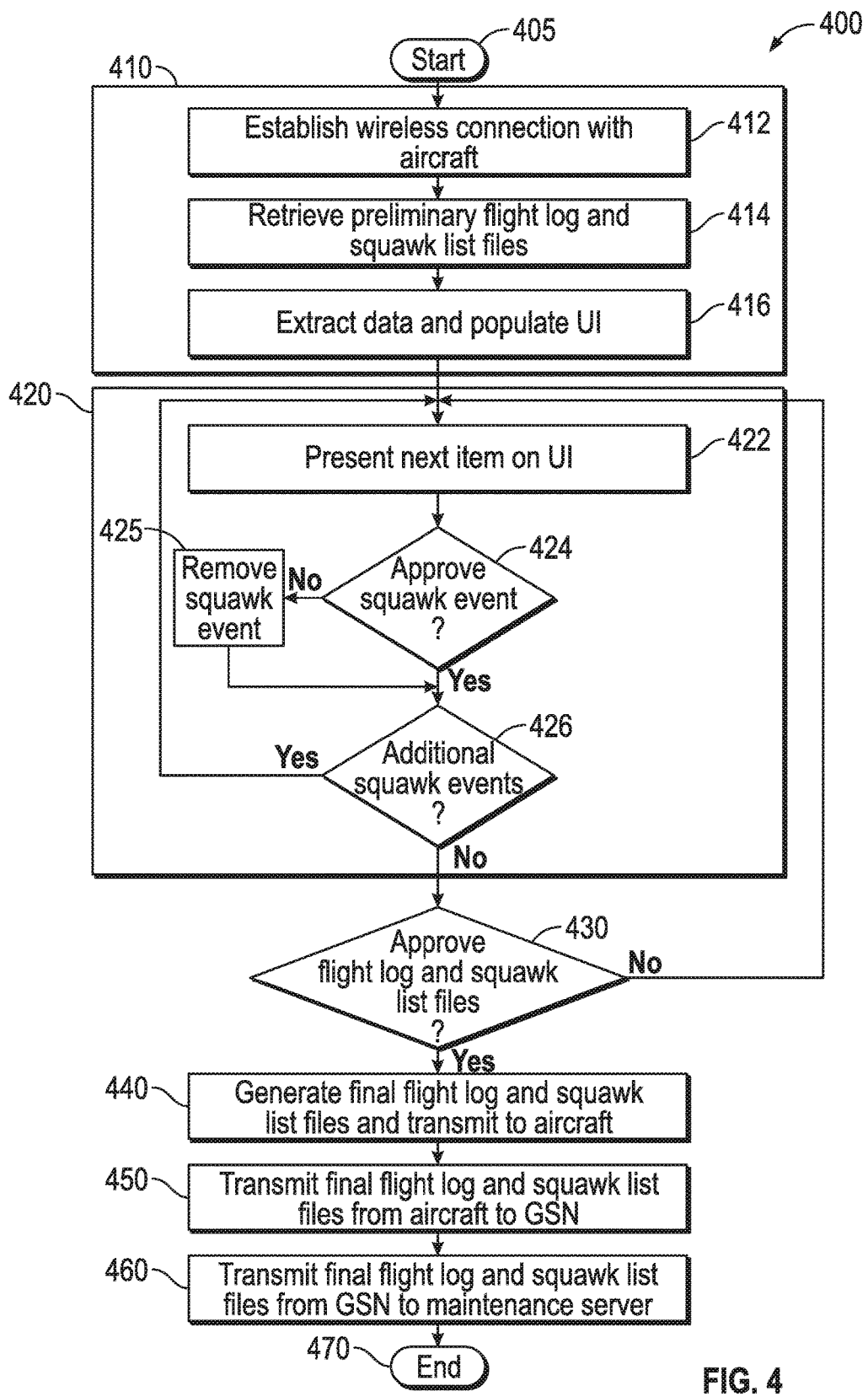
FIG. 4 is a method in accordance with some of the disclosed embodiments.

FIG. 4 is a method 400 in accordance with some of the disclosed embodiments. FIG. 4 will be described with reference to FIGS. 1-3. As a preliminary matter, it should be understood that the method 400 describes interaction between an on-board computer (e.g., 220 of FIG. 2B) at the aircraft and a wireless communication device 135 as a user of an application interacts with the application to generate of a final flight log and a final squawk list. The various tasks performed in connection with method 400 may be performed by software, hardware, firmware, or any combination thereof. In certain embodiments, some or all steps/tasks/acts of this process, and/or substantially equivalent steps/tasks/acts, are performed by execution of processor-readable instructions stored or included on a non-transitory processor-readable medium. For instance, references to a processor performing functions of the present disclosure refer to any one or more interworking computing components executing instructions, such as in the form of an algorithm, provided on at least one non-transitory processor-readable medium, such as a memory as described herein. For illustrative purposes, the following description of method 400 may refer to elements mentioned above in connection with FIGS. 1-3. In practice, portions of method 400 may be performed by different elements of the described system, e.g., component A, component B, or component C. In addition, it should be understood that steps/tasks/acts of the method 400 are not necessarily presented in any particular order and that performance of some or all the steps/tasks/acts in an alternative order is possible and is contemplated. The steps/tasks/acts have been presented in the demonstrated order for ease of description and illustration. Further, steps/tasks/acts can be added, omitted, and/or performed simultaneously without departing from the scope of the appended claims. As such, it should be appreciated that method 400 may include any number of additional or alternative tasks, the tasks shown in FIG. 4 need not be performed in the illustrated order, and method 400 may be incorporated into a more comprehensive procedure or process having additional functionality not described in detail herein. Moreover, one or more of the tasks shown in FIG. 4 could be omitted from an embodiment of the method 400 as long as the intended overall functionality remains intact. It should also be understood that the illustrated method 400 can end at any time.

It is noted that prior to the start of method 400, an on-board computer (e.g., an AHTMU 221) at the aircraft records flight log data for a flight in a preliminary flight log data file. This flight log data can be recorded, prior to flight, while the aircraft is in flight, and/or after the aircraft lands. The flight log can include flight identification information and flight data information. The flight identification information identifies information about the flight such as the date of the flight, flight leg, pilot name, co-pilot name, origin airport, destination airport, block-in time and block-out time, takeoff time, landing time, indication of whether the flight was a day flight or a night flight, etc. By contrast, flight data information is specific aircraft system data that is recorded before, during, or after the flight. Flight data information can indicate information regarding a state, a value, or a current cycle of any aircraft systems or sub-system. Examples of flight data information can include things such as amount of fuel burned, number of engine cycles, number of APU cycles, number of landing gear cycles, number of thrust reverser cycles, etc.

In addition, while the aircraft is in flight, the on-board computer (e.g., the AHTMU 221) at the aircraft automatically collects and records squawk events that occur (or are entered by the pilot or crew) in a "preliminary" squawk list file for that flight. The preliminary squawk list file includes a list of squawk events that are recorded during the flight. Each squawk event can be an event that can be detected, measured or observed during the flight. Items that are approved for inclusion in the final squawk list are those squawk events that are flagged to be investigated for a corrective action after the flight.

Examples of squawk events can include either discrepancies or events related to or associated with CAS messages. A discrepancy is an squawk event that is observed by a human and manually entered into the preliminary squawk list file by the human either pre-flight before takeoff, during the flight, or post-flight after the aircraft has landed. The discrepancy, once approved, is flagged to be investigated for a corrective action after the flight. By contrast, an event related to a CAS message is a squawk event that is automatically generated during flight and added to the preliminary squawk list file without human intervention. An event related to the CAS message can be detected, measured or observed during the flight. When approved by a user, that event is flagged to be investigated for a corrective action after the flight.

The method 400 begins at 405, when a trigger event occurs, and an on-board computer (e.g., an AHTMU 221) at the aircraft automatically generates a preliminary squawk list file that comprises a plurality of squawk events to be reviewed for potential inclusion in a final squawk list. In one implementation, the trigger event at 405 can be, for example, when the aircraft 110 lands and/or other trigger events occur to indicate that the aircraft 110 is on the ground (e.g., when an indication is received that an engine of the aircraft has been turned off, a door has opened or any other indication that the aircraft is on the ground). In one embodiment, the AHTMU 221 can then execute the flight log and squawk list file generation module 222 to generate a preliminary flight log data file and a preliminary squawk list file that includes a plurality of squawk events to be reviewed for potential inclusion in a final squawk list. The AHTMU 221 transfers the preliminary flight log data file and the preliminary squawk list file to an onboard cabin server 227 that is also implemented at the onboard computer 210. The onboard cabin server 227 can then directly or indirectly communicate this information to the wireless communication device 135.

At 410, a user (e.g., pilot/maintenance person) of the wireless communication device 135 makes an input (e.g., presses a button displayed on the graphical user interface of a tablet computing device, such as, an iPad or smartphone), to execute a software application that is designed to generate the final flight log and the final squawk list file.

When the software application is started, the software application causes the wireless communication device to establish a wireless connection with an on-board computer of the aircraft (at 412). For example, in one embodiment, when the software application begins executing, at 412, the wireless communication device 135 communicates the on-board computer 210 to establish a connection to the cabin server 227 via one of the wireless communication network interfaces. The wireless communication link can be, for example, a short-range wireless communication link such as a Wireless Local Area Network (WLAN) link or Bluetooth link or a loner-range wireless communication link such as a cellular link.

Once the connection is established, at 414, the wireless communication device 135 receives the preliminary flight log data file and the preliminary squawk list file from the cabin server 227. For example, in one embodiment, the software application at the wireless communication device 135 can communicate a request to the cabin server 227 to request the preliminary flight log data file and the preliminary squawk list file (that was created throughout the flight by the AHTMU 221) from the cabin server 227 over the wireless communication link that has been established with an onboard computer 210 of the aircraft 110. In response to the request message communicated from the wireless communication device, the cabin server 227 communicates the preliminary flight log data file and the preliminary squawk list file to the wireless communication device. In an alternative implementation, the cabin server 227 can automatically push the preliminary flight log data file and the preliminary squawk list file to the wireless communication device 135 once the wireless communication connection has been establish with the wireless communication device 135.

At 416, the software application at the wireless communication device 135 extracts information from the preliminary flight log data file and information associated with each squawk event from the preliminary squawk list file, and populates various fields of a graphical user interface (UI), that is displayed on a display of the wireless communication device, with information from the preliminary flight log data file and with information associated with each squawk event from the preliminary squawk list file. As will be describe below with reference to FIG. 5, the GUI can be used to present pertinent data from the preliminary flight log file and the preliminary squawk list file for review, updating and approval.

At 420, each squawk event from the preliminary squawk list file can be presented via the graphical user interface of wireless communication device for review and approval by the user (e.g., pilot or other person). Using the graphical user interface of wireless communication device, the user can review each squawk event in the preliminary squawk list for approval and inclusion in a final squawk list. For example, a user can then review each squawk event presented on the GUI of the wireless communication device 135, and for each squawk event presented on the GUI, the user can use an input/output device of the tablet computer to input additional information (if necessary), change or update information (if necessary). The user can use the input/output system to input information to either: approve the squawk event, remove/delete the squawk event, or edit the content of the squawk event. In this regard, for a particular squawk event in the preliminary squawk list, the user can input (1) an edit input to change content of that particular squawk event, (2) an approval input that indicates that the particular squawk event has been approved for inclusion in the final squawk list, or (3) a removal input that indicates that the particular squawk event has not been approved for inclusion in the final squawk list and is to be deleted/removed from the preliminary squawk list. In some embodiments, while reviewing the squawk events from the preliminary squawk list file, the user can also be presented with the option to add or input new squawk events by entering new information or making an "addition" input. Items that are approved are included in the final squawk list.

In one embodiment of 420, at 422, the next squawk event from the preliminary squawk list file can be presented via the graphical user interface for review and approval by the user. In one implementation of step 420, at 422, the user is presented with and reviews a "next" squawk event on the GUI of the wireless communication device 135 along with an option to approve that squawk event. The user can approve the squawk event with no changes, edit the squawk event before approving it (e.g., change information associated with that squawk event and/or enter new information for that squawk event), or reject the squawk event entirely. For example, when the squawk event is incomplete or inaccurate the user can edit prior to approving the squawk event. The user approves when the user determines that it is acceptable (accurate or complete) and in final approved form. When a squawk event is approved at 424 then that squawk event is included in the final squawk list, and the method 400 proceeds to 426. When appropriate, the user can edit the content of the squawk event prior to approving it. When a squawk event is not approved and is to be removed/deleted, at 425 that squawk event can be removed from the preliminary squawk list and the method proceeds to 426.

At 426, the software application checks to determine whether all squawk events have been reviewed. When all squawk events have not yet been reviewed the method 400 loops to 422. When the software application determines (at 426) that all squawk events in the preliminary squawk list have been reviewed (e.g., all squawk events have been presented, reviewed (e.g., changed or updated), approved or deleted), the method 400 proceeds to 430.

At 430, the software application queries the user to determine whether the squawk list and flight log data files are approved (e.g., by presenting a question to the user that requires the user to input an indication that the files have been approved and is in final form), and if so, the method then proceeds to step 440. By contrast, if the squawk list and flight log data files are not approved (e.g., the user inputs an indication that the files have not been approved and are not yet in final form), then the method loops back to 420 where the user continues to edit one or more squawk events in the squawk list and flight log data files prior to the final flight log and final squawk list file being generated at 440.

At 440, the software application at the wireless communication device 135 generates a final flight log and a final squawk list file (e.g., a single .xml file) that has been approved by the user. The final flight log includes the flight log data that was recorded (and possibly edited during review) and approved for inclusion in the final flight log. The final squawk list file includes each of the squawk events from the preliminary squawk list that have been reviewed (and possibly edited) and approved for inclusion in the final squawk list.

The final flight log and the final squawk list file can then be communicated from the wireless communication device to other computers of the integrated system 100 of FIG. 1.

For example in one embodiment illustrated in FIG. 4, the wireless communication device can communicate the final flight log and the final squawk list file over a wireless communication link to the cabin server 227 (via one of the interfaces 271). The cabin server 227 can then communicate this information to the AHTMU 221.

At 450, the AHTMU 221 can communicate the final flight log and the final squawk list file from the aircraft (via one of the interfaces 271 of FIG. 2B) to the ground support network (GSN) 116.

At 460, the GSN 116 can communicate the final flight log and the final squawk list file to the maintenance server 118 that executes one or more program modules to automatically upload and import the final flight log and the final squawk list file into records associated with the aircraft. The server 118 can be associated with a maintenance tracking software program that is part of a Computerized Maintenance Program (CMP).

The method then ends at 470.

Figure 5:
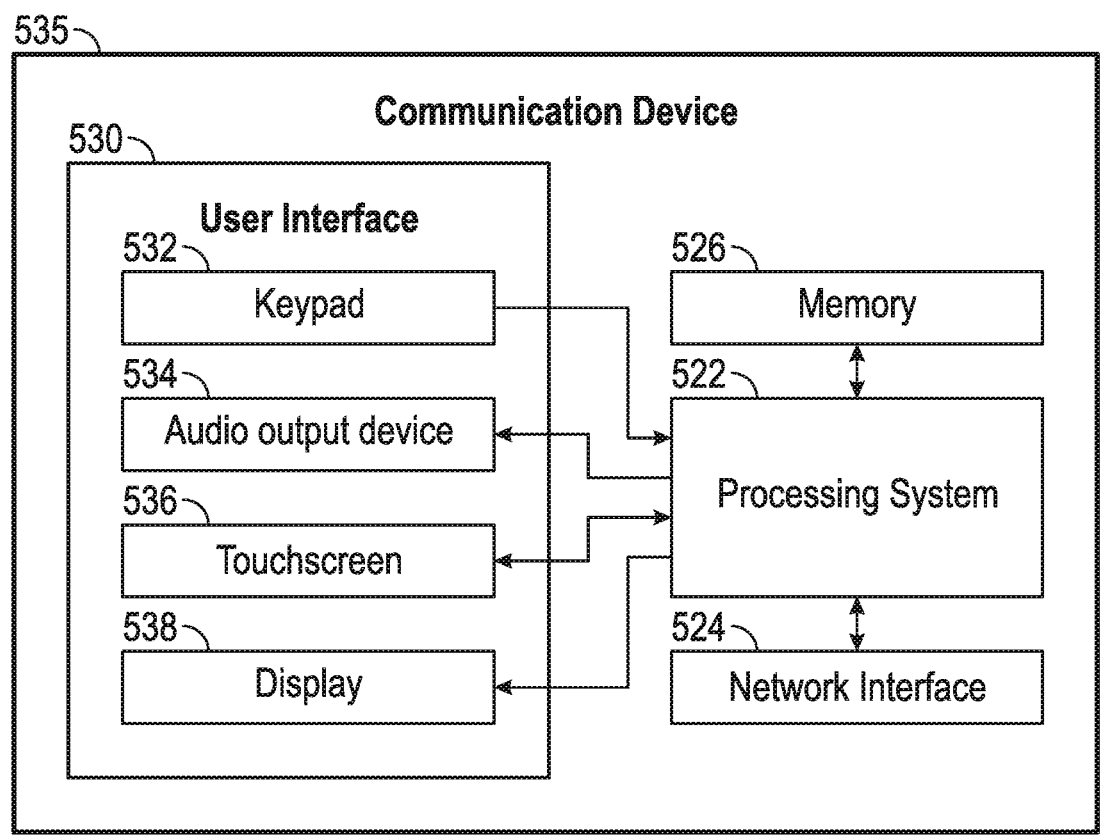
FIG. 5 is a block diagram that illustrates a wireless communication device in accordance with the disclosed embodiments.

FIG. 5 is a block diagram that illustrates a wireless communication device in accordance with the disclosed embodiments. Depending on the implementation, the wireless communication device 535 may be, for example but not by way of limitation, a cellular telephone (or "smartphone"), a computer (e.g., a tablet, a laptop, a notebook, or other computer), or any other network-enabled communication and/or computing device.

The wireless communication device 535 can include a processor or processing system 522, one or more network interfaces 524, a memory 526 that stores the software application (described above with respect to FIG. 4), and a user interface 530 that includes elements of an input/output system such as a keypad 532, an audio output device 534, touchscreen 536, a display 538, etc. The processing system 522 is coupled to one or more network interfaces 524, memory 526, and user interface circuitry 530.

Processing system 522 provides information to network interface 524 for transmission to the on-board computer 210 of the aircraft 110 either directly or indirectly over a network (e.g., a cellular network, local area network or other radio network not illustrated in FIG. 5). The processing system 522 receives information from network interface 524, which includes information transmitted by the on-board computer 210 of the aircraft 110 to wireless communication device 535 either directly or over a network.

Network interface 524 may include an antenna for receiving and transmitting radio frequency (RF) signals, receiver circuitry, transmitter circuitry, and circuitry to couple the antenna to the receiver circuitry and transmitter circuitry in a manner familiar to those skilled in the art. In an embodiment in which wireless communication device 535 interfaces with a wired network (e.g., a LAN, WAN, or other wired network), network interface 524 may include a network interface controller, network interface card or network adapter (e.g., a LAN or WAN adapter).

Memory 526 is configured to store information received from processing system 522 and to provide information to processing system 522. This information may include application software (e.g., the software application described above with reference to FIG. 3). In addition, memory 526 can also store the preliminary flight log, the preliminary squawk list file, the final flight log and the final squawk list file. Memory 526 can be implemented using any of the memory technologies described above with reference to FIG. 2B.

User interface circuitry 530 includes a plurality of devices adapted to receive information from a user of the wireless communication device 535 and/or to convey information (e.g., visual, audible, or tangible information) to the user. User interface circuitry 530 may include, for example, a keypad 532, one or more audio output devices 534, and both or either a touchscreen 536 and/or a display device 538. In addition, user interface circuitry 530 may include various other devices (e.g., a microphone and/or haptic device (e.g., a vibrator)), not shown. Keypad 532 and touchscreen 536 are configured to receive typed inputs from a user of wireless communication device 535, which inputs may include text, spaces, carriage returns, symbols, and control or text selection inputs (e.g., backspaces, deletions, text highlights, and so on). The keypad 532 can be implemented as part of the touchscreen 536.

Audio output device 534 may include one or more speakers for providing audio output to the user, which outputs may include speech, tones, clicks, ringtones, and other audible sounds Display device 538 and/or touchscreen 536 are configured to present video output to a the user, such as text being generated by the user through manipulation of the keypad 532 and information conveyed to the wireless communication device 535. Some non-limiting examples of screenshots of the graphical user interface (GUI) that may be produced by display device 538 are illustrated in FIGS. 6 through 12, which will now be described in greater detail.

Example Graphical User Interface (GUI)

FIGS. 6-12 are examples screens that can be displayed as part of a graphical user interface (GUI) that can be displayed at the wireless communication device 135 in accordance with the disclosed embodiments. This GUI illustrates a flight log page that includes certain flight log data for a flight (KLBB to KSAV) from a preliminary flight log data file. This page includes an aircraft registration number identifier 601, a column that includes a list of available flight logs 602, where each flight log in that column includes information about the departure airport, the arrival airport, the flight date, the block out time for each flight log, the number of squawk events related to CAS messages, and the number of squawk events that are manually-entered discrepancies. In this example, the first flight log is selected, and specifies KLBB as the Origination Airport Code of the departure airport, KSAV as the Destination Airport Code of the arrival airport, 26 Jul. 2012 as the flight date, 15:02 as the block out time, thirty-three (33) as the number of squawk events related to CAS messages, and zero (0) the number of squawk events that are manually-entered discrepancies. In addition, the page includes a Flight Log header 603.

Heading 608 indicates the Flight Log Status (Approved/Unapproved). Section 609 specifies various Flight Log Details about: (1) the aircraft (type, serial number, registration number), (2) the flight (including leg, departure date, departure airport, block out time, flight on time, starting fuel weight, APU hours, arrival date, arrival airport, flight off time, block in time, and ending fuel weight), and (3) the personnel (including the Captain, first officer, crew, and number of passengers). In some embodiments, any suspect data can appear in white text on black "negative" background (here the starting fuel and ending fuel amounts are shown this way). The page also includes a Home Button 610, a flight log button 611, and information 612 about the number of squawk events including the number of different types of CAS messages (e.g., Warnings=0, Caution=12, Advisory=21 and Info=0) and the number of manually-entered discrepancies, which is zero (0) in this example. This is an exemplary embodiment only and other sections could be included such as a remarks section, etc.

In general, each screen that is displayed as the graphical user interface of the wireless communication device (e.g., at 420 and 430 of FIG. 4) will have various buttons that can be used to select information or pages or items that they want to view, and various editable fields that are populated with information that can be edited.

Figure 6:
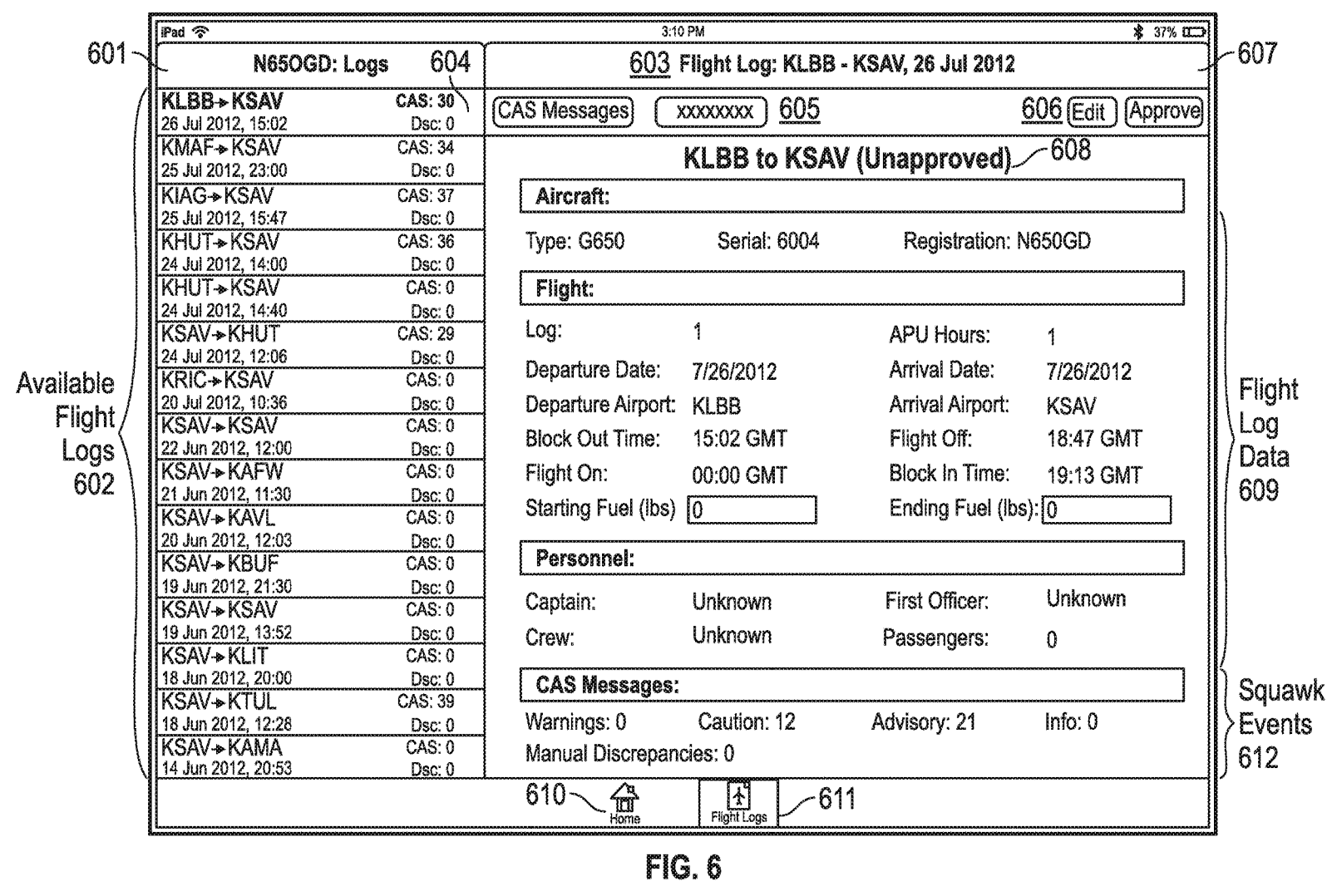

For instance, in this particular example, the user can use button 604 to select and view CAS messages for the selected Flight Log. After the user selects the desired flight log by tapping on it in the list of available flight logs 602 column, the user can tap the CAS messages button 604, and view a list of CAS messages as shown in FIG. 8. In one implementation, the CAS messages will be ordered by their relative priority and can each be color coded to reflect the type of type of CAS message (e.g., Warnings=0, Caution=12, Advisory=21 and Info=0). In some embodiments, when a user wants to approve a particular CAS message for inclusion in the final squawk list file, the user can tap upon the CAS message to mark it with a checkmark (and thus flag it as an item of importance and approve it for inclusion in the final squawk list file). Tapping the flight log button (at the top of FIG. 8) will return the user to the flight log details page (FIG. 6). Alternatively the user could tap a different entry in the list of available flight logs 602 column to return to the flight log details page (FIG. 6).

When a user taps a discrepancies button, additional buttons will be displayed on the UI that give the user options to view (and optionally edit) an existing discrepancy; add a new discrepancy; or delete an existing discrepancy. When the user selects view an existing discrepancy, the user can view that particular discrepancy and then has the option to edit/delete/approve that discrepancy.

Figure 11:

In this embodiment, the user can use button 605 to select and view discrepancies (if any) for the selected Flight Log. When the user taps the discrepancies button 605, a list of any discrepancies will be displayed as shown in FIG. 9, where there is only one discrepancy listed for sake of this particular example. As shown by the arrow in FIG. 9, the user can tap anywhere on the discrepancy to enable editing of the discrepancy. In addition, an additional button can be displayed that allows the user to delete the discrepancy if desired. When the user selects edit a discrepancy, they user can be given options as shown in FIG. 11. The user can then select the issue with the relevant category (e.g., the System, Subsystem, Component, etc.), by tapping the associated "Select" indicator (to the far right in FIG. 11) for the category that needs to be edited to bring up a list of items for that category, and the user can select an item from that list. The user does not need to change every field in FIG. 11 when the user is editing a discrepancy. After selecting the desired fields and items in the list associated with that field, the user can optionally enter remarks in the remarks section, and push the save button to save that discrepancy once they are finished. A message will then appear indicating whether the save operation was successful. That particular discrepancy will be added to the final squawk list file.

Figure 10:

As shown in FIG. 10, when there are no existing discrepancies, additional buttons will appear that allow the user to add a discrepancy, or tap the no discrepancies button to return to the flight log details page (FIG. 6). When the user selects add a discrepancy, they user can then be given options as shown in FIG. 11. The user can then select the appropriate item within each category (e.g., the System, Subsystem, Component, etc.) by tapping the associated "Select" indicator (to the far right in FIG. 11) to bring up a list of items for each category. The user can then select an item from each list and fill in appropriate information. After selecting an item in each list, the user can optionally enter remarks in the remarks section, and push the save button to save that discrepancy.

Figure 7:

Referring again to FIG. 6, the user can use button 606 to edit the selected Flight Log. For instance, in one implementation, when the user taps the edit button 606, a virtual keyboard will appear on the GUI as shown in FIG. 7, and the user can select any field within the Flight Log Data Section and edit that field (e.g., change values) using the virtual keyboard. The user can then tap a save changes button to save the changes, or can tap a cancel edit button to cancel out of the editing mode.

Once the user has viewed and approved all CAS messages and discrepancies, the user can use button 607 (of FIG. 6) to approve the selected Flight Log as shown in FIG. 12, and a check mark will appear next to the approved flight log. At this point, the heading 608 that indicates the Flight Log Status will indicate that is approved. Additional buttons can then be displayed that allow the user to upload the approved flight log(s) to the aircraft.

Those of skill in the art would further appreciate that the various illustrative logical blocks/tasks/steps, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
    recording, at an on-board computer, preliminary squawk events that occur while an aircraft is in flight;
    presenting, at a portable device, the preliminary squawk events;
    receiving approval inputs that indicate approved squawk events of the preliminary squawk events; and
    generating a squawk list that includes each of the approved squawk events to be investigated for corrective action after the flight.

2. The method of claim 1, further comprising receiving an edit input to change content of one of the preliminary squawk events.

3. The method of claim 1, further comprising receiving a removal input indicating a removed squawk event of the preliminary squawk events that is not to be included in the squawk list.

4. The method of claim 1, wherein presenting the preliminary squawk events includes presenting flight log data and information associated with each of the preliminary squawk event.

5. The method of claim 1, further comprising:
    in response to a request message communicated from the portable wireless communication device, communicating the preliminary squawk events from the aircraft to the portable device.

6. The method of claim 1, wherein each of the preliminary squawk events is either:
    a discrepancy that is observed by a human and manually entered by the human, wherein the discrepancy is flagged to be investigated for the corrective action after the flight; or
    added by an aircraft computer in response to a Crew Alerting System (CAS) message.

7. The method of claim 1, further comprising:
    recording flight log data for the flight; and
    generating a final flight log based on the flight log data after the flight.

8. The method of claim 7, wherein the final flight log comprises:
    flight identification information for the flight that identifies one or more of: date of the flight, flight leg, pilot name, co-pilot name, origin airport, destination airport, block-in time and block-out time, takeoff time, landing time, indication of whether the flight was a day flight or a night flight; and
    flight data information that indicates information regarding a state, a value, or a current cycle of any aircraft systems or sub-system.

9. The method of claim 7, further comprising:
    communicating the final flight log and the squawk list from the portable wireless communication device to a maintenance server.

10. The method of claim 9, wherein communicating the final flight log and the squawk list from the portable device to the maintenance server comprises:
    communicating the final flight log and the squawk list from the portable device to an on-board computer of the aircraft;
    communicating the final flight log and the squawk list from the on-board computer of the aircraft to a ground support network; and communicating the final flight log and the squawk list from the ground support network to the maintenance server, wherein the maintenance server automatically uploads and imports the final flight log and the squawk list into records associated with the aircraft.

11. A system, comprising:
an on-board computer for an aircraft, the on-board computer configured to record preliminary squawk events that occur while the aircraft is in flight for potential corrective action; and
a portable device configured to communicate with the on-board-computer, wherein the portable device is configured for:
receiving—from the on-board computer—preliminary squawk events that occur while the aircraft is in flight;
presenting the preliminary squawk events;
receiving approval inputs that indicate approved squawk events of the preliminary squawk events; and
generating a squawk list that includes each of the approved squawk events to be investigated for corrective action after the flight.

12. The system of claim 11, wherein the portable device is further configured for receiving an edit input to change content of one of the preliminary squawk events.

13. The system of claim 11, wherein the portable device is further configured for receiving a removal input indicating a removed squawk event of the preliminary squawk events that is not to be included in the squawk list.

14. The system of claim 11, wherein the portable device is further configured for presenting the preliminary squawk events including presenting flight log data and information associated with each of the preliminary squawk events.

15. The system of claim 11, wherein the portable device is further configured for, in response to a request message communicated from the portable wireless communication device, communicating the preliminary squawk events from the aircraft to the portable device.

16. The system of claim 11, wherein each of the preliminary squawk events is either:
a discrepancy that is observed by a human and manually entered by the human, wherein the discrepancy is flagged to be investigated for the corrective action after the flight; or
added by an aircraft computer in response to a Crew Alerting System (CAS) message.

17. The system of claim 11, wherein the portable device is further configured for:
recording flight log data for the flight; and
generating a final flight log based on the flight log data after the flight.

18. The system of claim 17, wherein the portable device is further configured for:
communicating the final flight log and the squawk list from the portable device to a maintenance server by:
communicating the final flight log and the squawk list from the portable device to the on-board computer;
communicating the final flight log and the squawk list from the on-board computer to a ground support network for the ground support network to communicate to the maintenance server, wherein the maintenance server automatically uploads and imports the final flight log and the squawk list into records associated with the aircraft.

19. A portable device configured to communicate with a computer of an aircraft, wherein the portable device is configured for:
receiving preliminary squawk events—from the computer of the aircraft—that occur while the aircraft is in flight;
presenting the preliminary squawk events;
receiving approval inputs that indicate approved squawk events of the preliminary squawk events; and
generating a squawk list that includes each of the approved squawk events to be investigated for corrective action after the flight.

* * * * *